Nov. 14, 1967  H. SKIERA  3,352,171
DRIVE MEANS FOR WELDING BLADES IN WELDING APPARATUS
Filed July 15, 1965  2 Sheets-Sheet 1

Inventor
HEINZ SKIERA
By Irwin S. Thompson
Attorney

United States Patent Office 3,352,171
Patented Nov. 14, 1967

3,352,171
DRIVE MEANS FOR WELDING BLADES IN
WELDING APPARATUS
Heinz Skiera, Teipzig, Germany, assignor to Veb Druckmaschinenwerke Leipzig, Leipzig, Germany
Filed July 15, 1965, Ser. No. 472,252
5 Claims. (Cl. 74—393)

ABSTRACT OF THE DISCLOSURE

Separation-welding blades which rotate and move at the same speed as a web of material while cutting and sealing the web of material to form sealed bags, the blades being driven by a telescopic shaft which has a universal joint at each end, the universal joints being perpendicular to each other and the angle of the shaft to the horizontal being variable between 0° and 45°.

---

Figure 1:
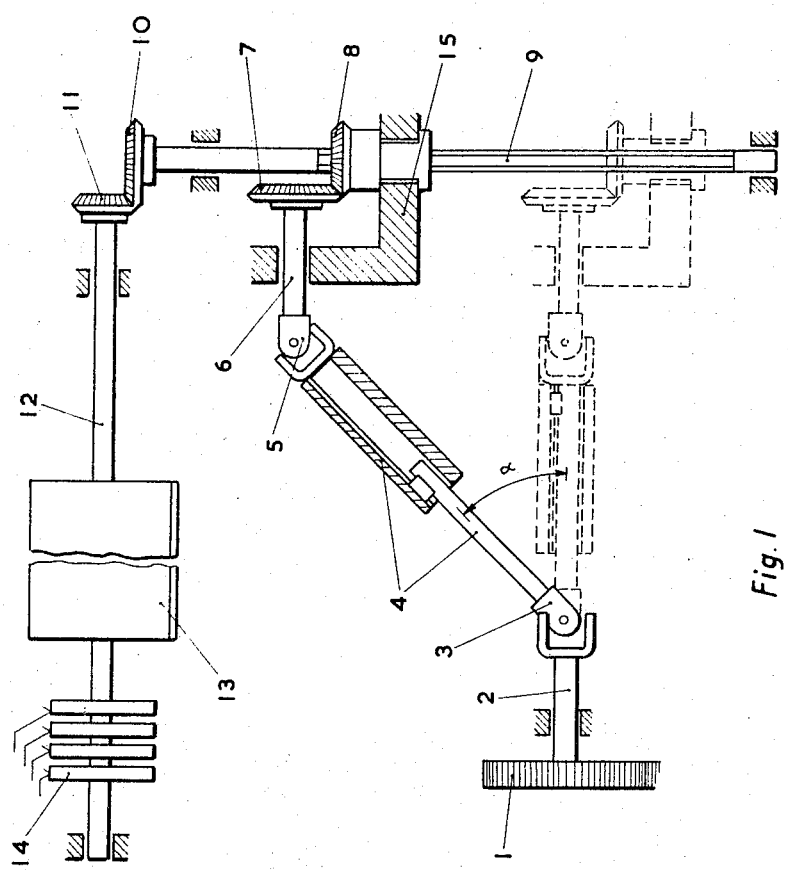

The invention relates to a drive device for separation-welding blades in devices for the continuous production especially of side-seam bags from weldable materials or for transverse cutters with rotating upper blade on rotary roll-printing machines or the like. In the production of side-seam bags the most various devices are used. The control of the welding beams or even separation-welding blades gave little trouble as long as one was content with intermittent conveying of the material web, so that the welding blade was lowered on to the material web while the latter was stationary. In such devices it was sufficient that at the moment when the material web was halted a pneumatic cylinder for example, triggered through an appropriate contact, operated the welding blade. In continuously moving material webs therefore the separation into bag lengths was initially abandoned and the welding was carried out by means of rotating welding beams, the peripheral speed of which was equal to the speed of the web. Then as the last operation of the device, with the aid of transverse cutters, the bags were separated from the material web.

However, with the problem of introducing the separation-welding method difficulties arose in that a rotating separation-welding blade must be moved during the separation-welding operation with the speed of the web and that in order to vary the section length the remainder of the movement operation as far as the renewed application had to be made variable. In order to avoid these difficulties again the separation-welding was effected in cadence. The material web was halted until the separation-welding operation was terminated, in order then to be conveyed further according to the bag length in each case. Difficulties arose in these devices immediately when they were to be placed after rotary printing machines, because then the cadence jolts had to be compensated within the material web by the arrangement of a plurality of tension pulleys. A high expense for machinery elements is necessary for this purpose.

Attempts were made to provide a remedy in that raisable and lowerable welding strips were made to accompany the material web, on a cylinder, over a part of the travel thereof. Such a device provides that about the centre point of the welding cylinder a raisable and lowerable welding strip is conducted back and forth on an arcuate piece of its periphery. It is here possible to vary the stepping distance of the reciprocating welding strip in the necessary form. However even this device is not suitable for separation-welding actions, since the material web must be withdrawn in its cohering form from the welding cylinder.

Therefore it was decided to utilize devices in which the separation-welding blade is so controllable on a circle-like path by a combined cam, eccentric and rocker or link gearing that during the separation-welding operation it moves by means of a further cam with a speed conforming with that of the material web and by means of yet a further cam with a position conforming with that of a welding support surface.

In such a method the separation-welding blade accompanies the movement over only a relatively short distance, a maximum of 30 mm., with the speed of the material web over a rotating or reciprocating support. The separation-welding blade after the termination of the separation-welding operation is immediately moved with the aid of the mentioned gear combination with accelerated speed away from the scene and the separated bag is also quickly removed with the aid of further conveying means, so that a continuous working process is ensured. In this device it is advantageous that a high expense for gear means and control cams is necessary in order to cause the separation-welding blade to move the relatively short distance with the speed of the web, in order to make the travel time on the remainder of the path of the blade variable.

Furthermore in this known device the fact that the separation-welding blade itself circulates standing perpendicularly on the predetermined path also has a disadvantageous effect. The centre of gravity thus also moves on a path which has a relatively great distance from the centre point of the path. Due to the necessary retardation and acceleration for the purpose of adaptation of speed of the blade during one revolution thus in addition to the occurring centrifugal forces there occur inertia forces which disturb a smooth running of the device and require a considerable reinforcement of the bearings, etc.

In transverse cutters with rotating upper blades on rotary roll-printing machines almost the same problems occur. Here again the object is to control the upper blade with the aid of gear means so that different section lengths are cut off and also to move the upper cutter with the same speed as the material web over a short distance, especially in the case of shears-type cutting, since otherwise the material web is buckled or torn. For the stepless variability of the rotation speed in these devices recourse was even made to steplessly regulable friction wheel gearings, the disadvantages of which are obvious. In these devices in order to vary the section length a retardation or acceleration of the blade during the time when it is not in engagement is not possible but is necessary and would be of particular advantage. For this purpose also the most various gearings became known, in which by combination of the most various gearing members the desired effect was brought about.

Now, in kinetics, universal joint gearings have become known in which preferably two universal joints, also called Hooke's joints, hereinafter called joints for the sake of simplicity, were arranged one behind the other, which gains the advantage of a gearing with drive and driven shafts parallel with one another.

In this gearing the advantage was known that at various deflection angles the angles of rotation of the driving and driven shafts are in such relationships that for example in the case of a drive angle of 50° the drive-output angle amounts to only 37°.

The invention faces the problem of providing a drive arrangement with the aid of which, using only a few gear members with low wear, the problem can be solved of causing a rotating blade to move during a short distance with a nearly uniform movement and of making the remainder of the path of the blade as far as re-engagement variable as regards speed and thus the time unit between the drive periods. There is also the problem of exploiting the advantages of a universal joint gearing and by the logical application thereof of varying the speed of a separation-welding blade or of a rotating upper blade in the case of transverse cutters steplessly during a revolution.

According to the invention this is achieved due to the fact that between the separation-welding blade or the rotating upper blade and its drive wheel in each case there is arranged, in order to generate a non-uniform, steplessly variable course of movement, a universal joint gearing known per se, which however is variable in its spacing of the parallel shafts and is equipped with joints offset by 90° in relation to one another. The joint arranged on the drive side here is rigidly connected on one side with the stationarily mounted shaft and thus the drive wheel and on the other side with a telescopic shaft, on the opposite end of which there is secured the second joint, arranged offset through 90°, the drive output member of which is connected through a further shaft with a pair of bevel gears. The entire drive output side is arranged displaceably at a deflection angle of 0–45° together with a housing on a multi-splined shaft. The drive wheel is connected with the drive of the material web and rotates one and a half turns per material section. The transmission ratio of the two bevel gear pairs amounts as a whole to 1:2.

Figure 2:
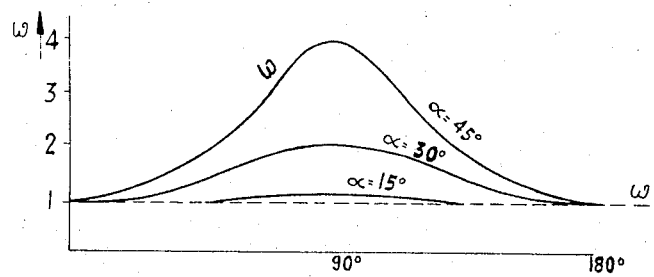
Figure 3:
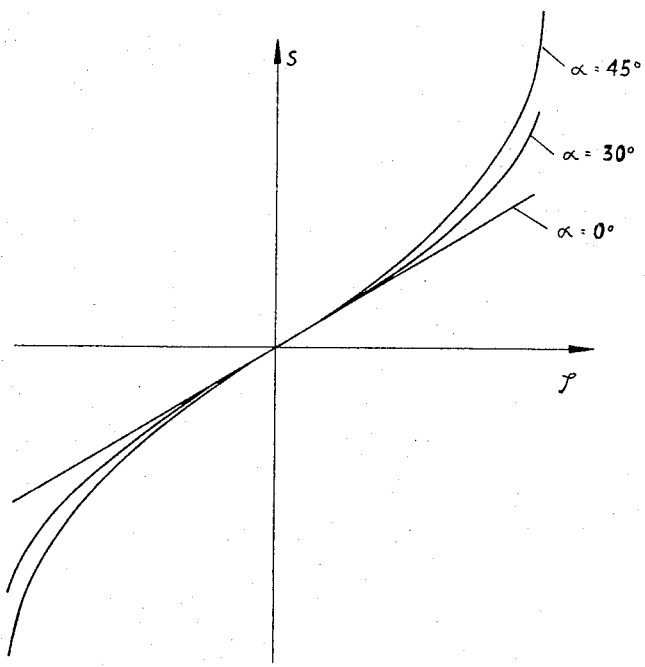

The invention is to be explained in greater detail hereinafter with reference to an example of embodiment. In the accompanying drawing:

FIGURE 1 shows the front elevation of the arrangement according to the invention, represented partially in section, FIGURE 2 shows a diagram in which it is illustrated how at the various deflection angles the angular speed varies in each case, FIGURE 3 shows a diagram of the variation of the blade travel in relation to the material web.

A drive wheel 1 is connected with the material web drive and rotates one and a half turns per material section or bag. A shaft 2 mounted in the machine frame is firmly connected with the drive wheel 1 and carries on the other side a joint 3, which again is rigidly connected with a telescopic shaft 4. Through a joint 5 the movement is transmitted from the telescopic shaft 4 to a shaft 6 and thus to a pair of bevel gears 7 and 8. The bevel gear 8 is displaceably arranged on a multi-splined shaft 9 and at the other end of the multi-splined shaft its movement is transmitted through a pair of bevel gears 10, 11 to the blade shaft 12. In FIGURE 1 on the blade shaft 12 there is illustrated a separation-welding blade 13 and beside it slip rings 14 for the separation-welding blade heating and possible temperature measurements.

Due to the fact that the bevel gear 8 is displaceable on on the multi-splined shaft 9, the entire drive output side of the universal joint gearing 2–6 can be pivoted together with the housing 15 through an angle α. This angle α is variable from 0–45°. In FIGURE 1 there is illustrated in thin chain lines the straight position at the angle α=0°. From FIGURE 2 it can be seen that in this case no acceleration of the separation-welding blade or of a rotating upper blade takes place. As illustrated in FIGURE 3, then the blade travel is equal to the travel of the material web which is conducted through beneath the separation-welding blade 13 during one revolution thereof. That is to say thus at a deflection angle α=0° the blade will rotate uniformly. This speed of the blade thus gives the maximum possible section length. At an angle α=45° on the other hand the blade is accelerated after cutting in such manner that at one revolution thereof the minimum section lengths are achieved.

From FIGURE 2 it may be seen that the angular speed in the case of a rotation of the drive side through 90°, that is 180° in the case of the separation-welding blade 13, is increased to the maximum and is again reduced until the next working operation so far that for the duration of the separation-welding operation the blade again assumes the speed of the material web. The adaptation of the blade speed at the cutting moment to the speed of the material web can thus be brought about by simple displacement of the bevel gear pair 7, 8 with the aid of suitable means.

I claim:

1. A drive mechanism for rotary tools for cutting and sealing a moving web of material, said drive mechanism comprising, in combination, a driving gearwheel, an input shaft connected to said driving gearwheel, an intermediate shaft variable in length, a first universal joint connecting said input shaft to said intermediate shaft, a fork end in the first universal joint, an output shaft, a second universal joint connecting said intermediate shaft to said output shaft, a fork end in the second universal joint, the fork ends of said first and second joints on said intermediate shaft being mutually perpendicular, a tool shaft, and a gear train connecting said output shaft to said tool shaft so that the angle of deflection between said intermediate shaft and said output or input shaft can be varied; whereby, when said angle of deflection is not zero the angular speed of said rotary tool is the same as the speed of the web of material while said rotary tool is operating thereon, and is driven between operations at a variable angular speed the amplitude of which is proportional to the angle of deflection.

2. A drive mechanism as claimed in claim 1, wherein said gear train comprises a first bevel gearwheel on said output shaft, a multi-splined shaft at right angles to said output shaft, an axially-movable second bevel gearwheel on said splined shaft meshing with said first bevel gearwheel on said output shaft, a third bevel gearwheel secured to said splined shaft, a fourth bevel gearwheel secured to said tool shaft which meshes with said third bevel gearwheel secured to said splined shaft and a housing axially movable along said splined shaft having said output shaft and said second bevel gearwheel rotatably connected thereto; whereby moving said housing axially along said splined shaft said deflection angle can be varied from 0° to 45°.

3. A drive mechanism as claimed in claim 2 wherein said total gearing ratio between said first bevel gearwheel and said fourth bevel gearwheel in 1:2.

4. A drive mechanism as claimed in claim 3 wherein said driving gearwheel rotates for one-and-a-half rotations for each cut made by the rotating tool in said webs of material.

5. A drive mechanism as claimed in claim 2, wherein said intermediate shaft is telescopic.

References Cited

UNITED STATES PATENTS

| | | | |
|---|---|---|---|
| 2,764,033 | 9/1956 | Lane | 64—1 X |
| 2,810,274 | 10/1957 | Weasler | 64—1 |
| 3,148,517 | 9/1964 | Kinser | 64—1 |
| 3,293,884 | 12/1966 | Grob | 64—1 X |

DONLEY J. STOCKING, *Primary Examiner.*

L. H. GERIN, *Assistant Examiner.*